US009886772B2

United States Patent
Tanner

(10) Patent No.: US 9,886,772 B2
(45) Date of Patent: Feb. 6, 2018

(54) SYSTEM FOR CORRECTING RPC CAMERA MODEL POINTING ERRORS USING 2 SETS OF STEREO IMAGE PAIRS AND PROBABILISTIC 3-DIMENSIONAL MODELS

(71) Applicant: RAYTHEON COMPANY, Waltham, MA (US)

(72) Inventor: Franklin R. Tanner, Asburn, VA (US)

(73) Assignee: Raytheon Company, Waltham, MA (US)

( * ) Notice: Subject to any disclaimer, the term of this patent is extended or adjusted under 35 U.S.C. 154(b) by 302 days.

(21) Appl. No.: 14/739,215

(22) Filed: Jun. 15, 2015

(65) Prior Publication Data

US 2015/0279046 A1  Oct. 1, 2015

Related U.S. Application Data

(62) Division of application No. 13/631,811, filed on Sep. 28, 2012, now Pat. No. 9,083,961.

(51) Int. Cl.
*H04N 13/02* (2006.01)
*G06K 9/32* (2006.01)
(Continued)

(52) U.S. Cl.
CPC ............ *G06T 7/593* (2017.01); *G06K 9/0063* (2013.01); *H04N 13/0282* (2013.01); *G06T 2207/10032* (2013.01)

(58) Field of Classification Search
CPC .............................. G06T 7/0075; G06K 9/0063
See application file for complete search history.

(56) References Cited

U.S. PATENT DOCUMENTS 7,881,497 B2 * 2/2011 Ganguli ............... G05D 1/0246
  382/104
8,452,081 B2 * 5/2013 Wang .................... G06T 15/205
  382/154

(Continued)

OTHER PUBLICATIONS

Digital Globe; "Content Collection for Quickbird"; [http://www.digitalglobe.com/about-us/content-collection#satellites&quickbird][Retrieved: Nov. 11, 2011].

(Continued)

*Primary Examiner* — Tsion B Owens
(74) *Attorney, Agent, or Firm* — Burns & Levinson LLP; Joseph M. Maraia

(57) ABSTRACT

A modeling engine (ME) for generating or "bootstrapping" a three dimensional edge model (3DEM) from two stereo pairs of images and correcting engine (CE) for correcting a camera model associated with an image are provided. The ME back projects edge detected images into 3DEMs using camera models associated with the stereo images, updates and stereo updates voxel probabilities in the 3DEM s with back projections of the edge detected images, and then merges the 3DEMs together to create a "sparse" 3DEM. The CE calculates a registration solution mapping an edge detected image of an image to an expected edge image. The expected edge image is a projection of a 3DEM using a camera model associated with the image. The CE corrects the camera model by applying the registration solution to the camera model based on determining whether the registration solution is a high confidence registration solution.

4 Claims, 6 Drawing Sheets

(51) Int. Cl.
  *G06T 7/593* (2017.01)
  *G06K 9/00* (2006.01)

(56) References Cited

U.S. PATENT DOCUMENTS

| | | | | |
|---|---|---|---|---|
| 2003/0090593 A1* | 5/2003 | Xiong | ............... | H04N 5/23248 348/620 |
| 2004/0247174 A1* | 12/2004 | Lyons | ............... | G06F 3/04845 382/154 |
| 2008/0111815 A1* | 5/2008 | Graves | ................... | G06T 17/10 345/420 |
| 2013/0329012 A1* | 12/2013 | Bartos | ............... | H04N 13/0246 348/46 |

OTHER PUBLICATIONS

Grodecki et al.; "Block Adjustment of High-Resolution Satellite Images Described by Rational Polynomials"; Photogrammetric Engineering and Remote Sensing; 69(1):59-68 (2003).

Pollard et al.; "A Volumetric Approach to Change Detection Satellite Imagery"; Photogrammetric Engineering and Remote Sensing; 76(7):817-831 (2010).

Russell et al.; "Artificial Intelligence—A Modem Approach"; Chapter 20, 619-623, Prentice Hall, Upper Saddle River, New Jersey (1995).

Simonson et al.; "A Statistics Based Approach to Binary Image Registration with Uncertainty Analysis"; IEEE Transactions on Pattern Analysis and Machine Intelligence; 29:1, 112-125 (Jan. 2007).

* cited by examiner

SYSTEM FOR CORRECTING RPC CAMERA MODEL POINTING ERRORS USING 2 SETS OF STEREO IMAGE PAIRS AND PROBABILISTIC 3-DIMENSIONAL MODELS

CROSS-REFERENCE TO RELATED APPLICATION(S)

This application is a divisional of U.S. patent application Ser. No. 13/631,811, filed on Sep. 28, 2012 and entitled "A SYSTEM FOR CORRECTING RPC CAMERA MODEL POINTING ERRORS USING 2 SETS OF STEREO IMAGE PAIRS AND PROBABILISTIC 3-DIMENSIONAL MODELS," the entirety of which is hereby incorporated herein by reference.

STATEMENT OF GOVERNMENT RIGHTS

The invention was supported, in whole or in part, by Government Contract No: HM1582-06-C-0017 with the Department of Defense. The Government has certain rights in the invention.

BACKGROUND

Building probabilistic three-dimensional models (P3DMs) from satellite imagery requires extremely accurate camera data. Commercial and National Technical Means imagery has a well defined camera model in the National Imagery Transmission Format (NITF) header that contains Rational Polynomial Coefficient (RPC) pointing data. This RPC data aids in back projecting 2-dimensional (2D) pixel data into 3-dimensional (3D) space. However, all RPC camera data has some amount of uncertainty associated with them. For example, Digital Globe's Quickbird satellite advertises a 23 meter circular error and 17 meter linear error of [1]. In order to build an accurate P3DM, camera pose data must be accurate to the lowest level of a volume element or "voxel" represented in the model. For example, if the voxels in the P3DM are each 1 meter in size, the pointing accuracy must be at least 1 meter.

P3DMs have been successfully demonstrated to correct satellite RPC pointing errors. The state of the art technique is described in [2]. In [2], the authors describe an approach to correct satellite pointing errors by using probabilistic three dimensional edge models (3D edge models) combined with and a block adjustment algorithm. 3D edge models are distinct from P3DMs in that they only contain probabilistic edge elements in volumetric space as opposed to the appearance and surface geometry data found in full P3DMs. The procedure begins by using 5 precisely registered satellite images taken from a diverse set of collection geometries to create a 3D edge model. Since it is grounded in true geo-coordinates, once created, the 3D edge model can be rendered from any arbitrary viewing angle. Given a 3D edge model and a new satellite image with RPCs, the 3D edge model can be projected and rendered into the same camera frame as the new image. From there, assuming a high-quality 3D edge model, the satellite image simply needs to be block adjusted using a procedure, such as that described in [3] to correct the pointing error.

The authors of [2] corrected a set of training images using a manually selected tie-point across the set of images. This manual correction step is required since, as noted above, all satellite images have some level of pointing uncertainty in the RPC data. Without this step, the pointing errors would be too great to allow the 3D model to converge accurately. However, for satellite systems with very complex and diverse viewing parameters (i.e. illumination, geometry, etc.), the number of accurate camera models needs to be drastically increased. Experiments with P3DM on National Geospatial-Intelligence Agency (NGA) imagery, for example, indicates that as many as 10-20 images may be required depending on the area of interest.

Alternatively, the authors of [4] used a high-resolution Light Detection and Ranging (LiDAR) Digital Elevation Model (DEM) to seed their 3D edge model instead of a set of manually adjusted images. This technique has proven successful for those limited areas of interest where a high quality LiDAR DEM is available.

The use of manually corrected imagery or a LiDAR DEM is often referred to as "bootstrapping" a 3D edge model. The aforementioned techniques have their limitations. For example, manually correcting imagery camera models can be time consuming and requires a certain amount of training to perform. LiDAR is not available for modeling denied areas. Without a set of manually corrected images or a LiDAR DEM, there is currently no technique to automatically build P3DMs and use the built P3DMs to correct satellite pointing errors.

SUMMARY

Described herein are techniques and devices for processing an image. In particular, two stereo pairs of images of an area of interest are processed to generate a three dimensional edge model, which may then be used to correct camera models associated with images.

In some aspects, this disclosure provides a process for generating a three dimensional edge model from two stereo pairs of images of an area of interest. The process includes generating a first edge detected image from a first stereo image. The first edge detected image representing edges detected in the first stereo image. The process includes back projecting the first edge detected image into a first three dimensional edge model using a camera model associated with the first stereo image. The first three dimensional edge model being a volume of voxels in which each voxel has a probability, referred to as a voxel probability, that a given back projection of the first edge detected image intersecting a subject voxel is an edge. The process includes updating the voxel probabilities in the first three dimensional edge model with back projections of the first edge detected image. The process then includes generating a second edge detected image from a second stereo image. The second edge detected image representing edges detected in the second stereo image. The process includes back projecting the second edge detected image into the first three dimensional edge model using a camera model associated with the second stereo image. The process then includes stereo updating the voxel probabilities in the first three dimensional edge model with back projections of the second edge detected image. The process includes for a second stereo pair, repeating the foregoing resulting in a second three dimensional edge model. The process then includes merging the first three dimensional edge model and second three dimensional edge model resulting in a merged three dimensional edge model.

In some aspects, this disclosure provides a process for correcting an inaccurate camera model associated with an image. The process includes generating an edge detected image from an image. The image is associated with an inaccurate camera model. The process includes projecting a three dimensional edge model with the inaccurate camera model resulting in an expected edge image. The process includes calculating a subject registration solution registering the edge detected image to the expected edge image. The process includes determining whether the calculated subject registration is a high confidence registration solution. The process includes based on the determination, applying the subject registration solution to the inaccurate camera model resulting in a corrected camera model associated with the image.

In other examples, any of the aspects above can include one or more of the following features.

In some examples, generating the first edge detected image and second edge detected image includes performing Canny edge detection on the first stereo image and second stereo image, respectively.

In other examples, back projecting includes for each pixel in the first edge detected image and second edge detected image, back projecting a respective pixel into the first three dimensional edge model using the camera models associated with the first stereo image and second first stereo image.

In some examples, stereo updating includes triangulating a z location of an edge from the back projections of the first edge detected image and second edge detected image.

In other examples, merging includes finding a best fit between the first three dimensional edge model and second three dimensional edge model; and for each voxel in the first three dimensional edge model, multiplying a subject voxel by voxels in the second three dimensional edge model shifted by the best fit.

In some examples, finding the best fit includes shifting the voxels of the first three dimensional edge model in the x, y, and z directions resulting in shifted voxels and matching edges corresponding to the shifted voxels to edges corresponding to the voxels in the second three dimensional edge model, the best fit being a function of the matching.

In other examples, the process further includes refining the merged three dimensional edge model with a subsequent image.

In some examples, refining includes generating an edge detected image from the subsequent image, projecting the merged three dimensional edge model with a camera model associated with the subsequent image resulting in an expected edge image, determining a subject registration solution registering the expected edge image to the edge detected image, determining whether the subject registration solution is a high confidence registration solution, and updating the merged three dimensional edge model with the subsequent image based on the determination.

In other examples, calculating the subject registration solution includes computing a two-dimensional linear transformation and/or affine transformation mapping the expected edge image to the edge detected image.

In some examples, determining whether the subject registration solution is a high confidence registration solution includes evaluating whether the subject registration solution is statistically better than alternative registration solutions as defined by a Gaussian random distribution of solutions, establishing a precision metric based on the evaluation, the confidence of the subject registration solution is determined based on the established precision metric.

In other examples, evaluating includes using McNemar statistics to evaluate the subject and alternative registration solutions.

The techniques and devices, or "technology," described herein for generating a three dimensional edge model from two stereo pairs of images of an area of interest and for correcting an inaccurate camera model associated with an image while accounting for the precision of image to model registration solutions offers one or more the following advantages. The technology advantageously bootstraps a three-dimensional edge model automatically without the time and expertise required for manually correcting imagery camera models. The technology advantageously makes use of readily available stereo image pairs. The technology advantageously rejects images with imprecise camera model data that would corrupt a three dimensional edge model.

DESCRIPTION

Figure 1:
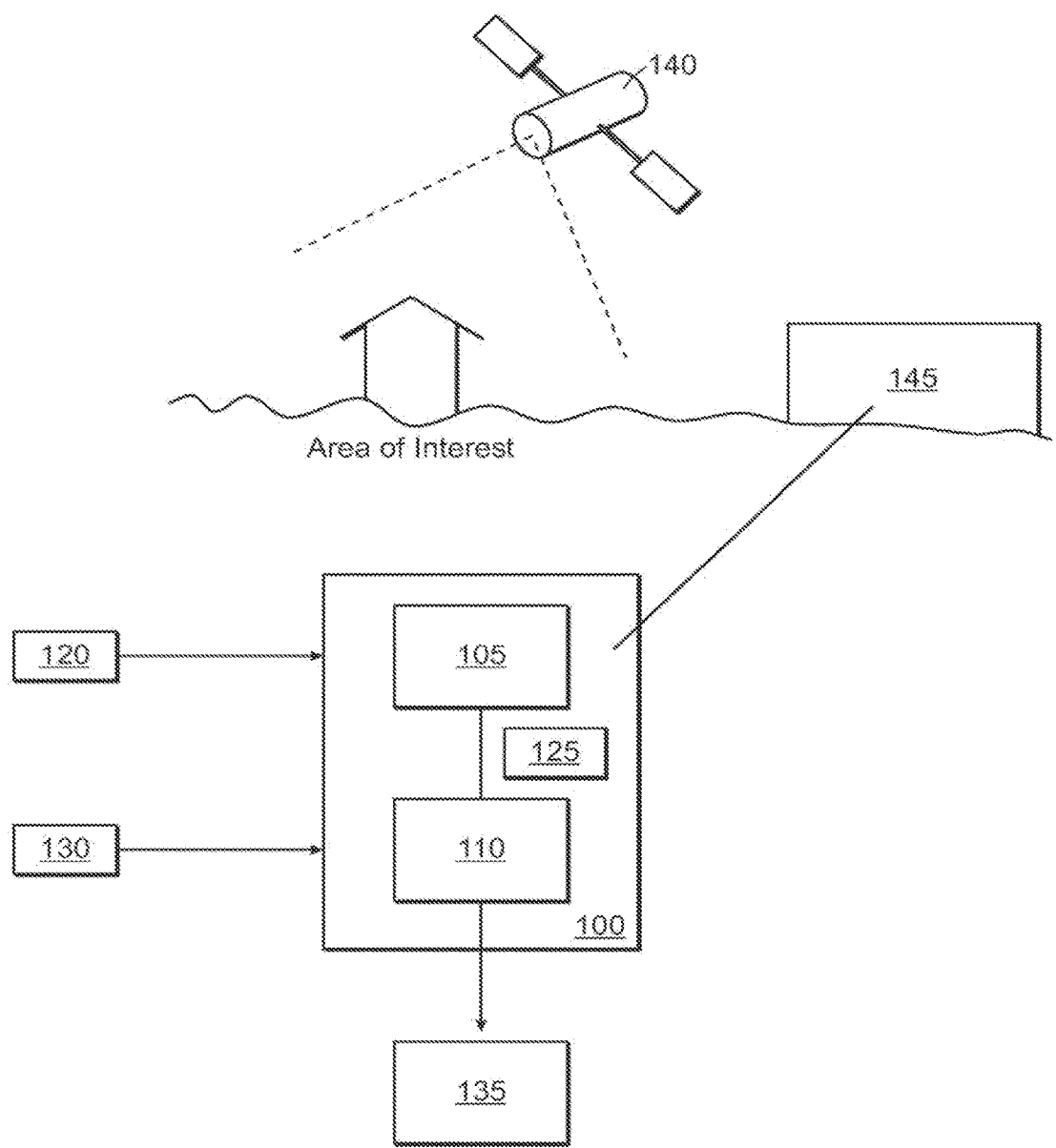
FIG. 1 is a block diagram of an example camera correcting system in which examples of a modeling engine and correcting engine may be used.

According to some examples, FIG. 1 shows a camera correcting system 100, which may be generally used to correct Rational Polynomial Coefficient (RPC) pointing data. The camera correcting system 100 includes a modeling engine 105 and correcting engine 110. The modeling engine 105 processes 2 sets of stereo pair images (or simply "stereo pairs") 120 to produce a three-dimensional edge model 125. The correcting engine 110 uses the three-dimensional edge model 125 to correct a RPC camera model associated with an image, collectively referred to as an "image" 130. The result of camera correcting system 100 is a corrected RPC camera model and image or simply "corrected image" 135. The corrected RPC camera model can then be used, advantageously, to create high quality three dimension models or renderings. It is important to note that in the process of correcting an RPC camera model, the image associated with the model remains unaltered.

Described in greater detail below, some examples of the modeling engine 105 refine (update) the three-dimensional edge model 125 with additional images, which in some cases, include the image 130. In a convenient example, the modeling engine 105 determines a metric indicative of how precise is an image, i.e., the associated camera model, relative to the three-dimensional edge model 125, so that the camera correcting system 100 advantageously does not corrupt the three-dimensional edge model 125 with imprecise camera model data.

Also described in greater detail below, some examples of the correcting engine 110 use a linear transformation approach, affine transformation approach or a combination of linear transformation and affine transformation approaches to find the "best" image to model registration solution or simply "registration solution" on which to base a correction to a camera model. In a convenient example, the correcting engine 110 determines a metric indicative of how precise is an image-to-model registration solution is relative to the three-dimensional edge model 125, so that the camera correcting system 100 advantageously notifies an operator or user that the image cannot be corrected (e.g., the camera data has many errors). Such an image (i.e., the associated camera model) may then be corrected manually.

Continuing with reference to the example shown FIG. 1, the image 130 (with associated camera model) of an area of interest is taken by a satellite 140 (or other imaging platform, such as a reconnaissance aircraft). The satellite 140 communicates the image 130 to a (terrestrial) base station 145 for processing by the camera correcting system 100, for example. In other examples, the satellite 140 (or other imaging platform) includes the camera correcting system 100. In these examples, the satellite 140 communicates the corrected image 135 to the base station 145 for further processing or archiving, for example.

The disclosure describes a novel technique for bootstrapping a P3DM, automatically, using 2 sets of stereo pair images (or simply "stereo pairs"). The automatic bootstrapping technique is particularly useful for modeling denied areas where LiDAR is not available. The automatic bootstrapping technique is particularly useful for situations in which manually correcting imagery camera models is time consuming and requires a certain amount of training to perform. The automatic bootstrapping technique can use the large libraries of stereo pairs maintained by government agencies, making the technique especially advantageous over other approaches.

According to the examples, the stereo pairs in question do not need to be accurate relative to one another; the stereo pairs only need to be accurate among themselves. In other words, stereo set A={a1, a2} must have camera models that are accurate to each other and stereo set B={b1, b2} must have camera models that are accurate to each other but stereo set A and stereo set B do not need to be accurate to one another.

Figure 2:
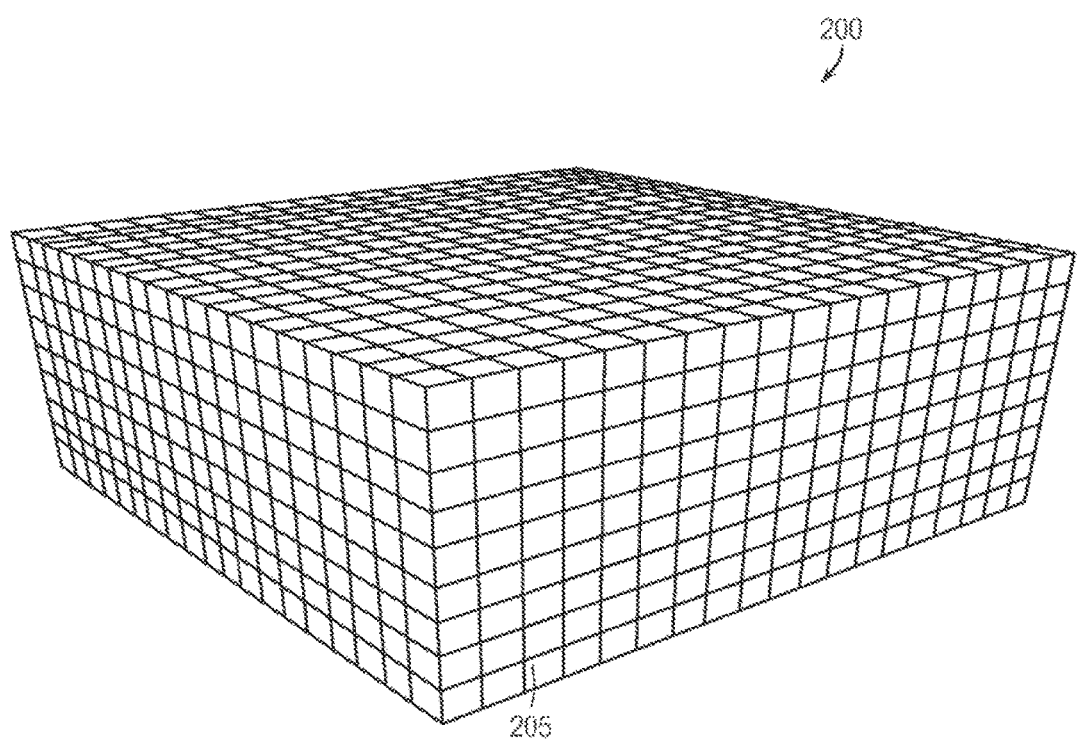
FIG. 2 is a diagram of a volume of elements called "voxels."

Prior to the development of the automatic bootstrapping technique, building P3DMs required a set of manually registered images or LiDAR. Typically, LiDAR is not available over denied areas and manual registration of images is error prone and prohibitively time consuming for an analysts. The automatic bootstrapping technique enables "push button" creation of probabilistic volumetric 3D reconstructions of scenes. Before describing examples of the automatic bootstrapping technique, the following is provided as background P3DMs (also called probabilistic volumetric representation or "PVR") are probabilistic volumetric representations of appearance and geometry of an area of interest (AOI). "Volumetric" in this definition means that every point in 3D space has a certain probability of being a surface. This is opposed to traditional 3D models, which are actually 2.5D or X,Y, and (H)eight as opposed to X, Y, and Z. A P3DM is comprised of 2 separate models, a three dimensional edge model (3D edge model) used exclusively for camera model correction and a 3D appearance model (commonly referred to as a "3D model"). A P3DM carves a geospatial region of interest into a volume of elements called "voxels," such as those shown in FIG. 2. Each voxel has a probability (e.g., from 0 to 100 percent probability), referred to as a "voxel probability," that a given back projection of an edge detected image intersecting a subject voxel is an edge. In contrast, a binary representation of an edge detected image, such as those used in previous image registration techniques by others, maps pixels representing edges to logical one and pixels representing other than edges to logical zero. One advantage to using a P3DM over a binary image for image registration is that probabilistic edges allow for better registration across images of multiple ground sample distances (GSD). For example, if one image had a GSD of 2 meters and a second image had a GSD of 1 meter, this would introduce at least 1 meter of uncertainty even if the registration solution were perfect (not likely). Advantageously, having a 3D edge model allows projection of a model into an arbitrary GSD.

Figure 3:
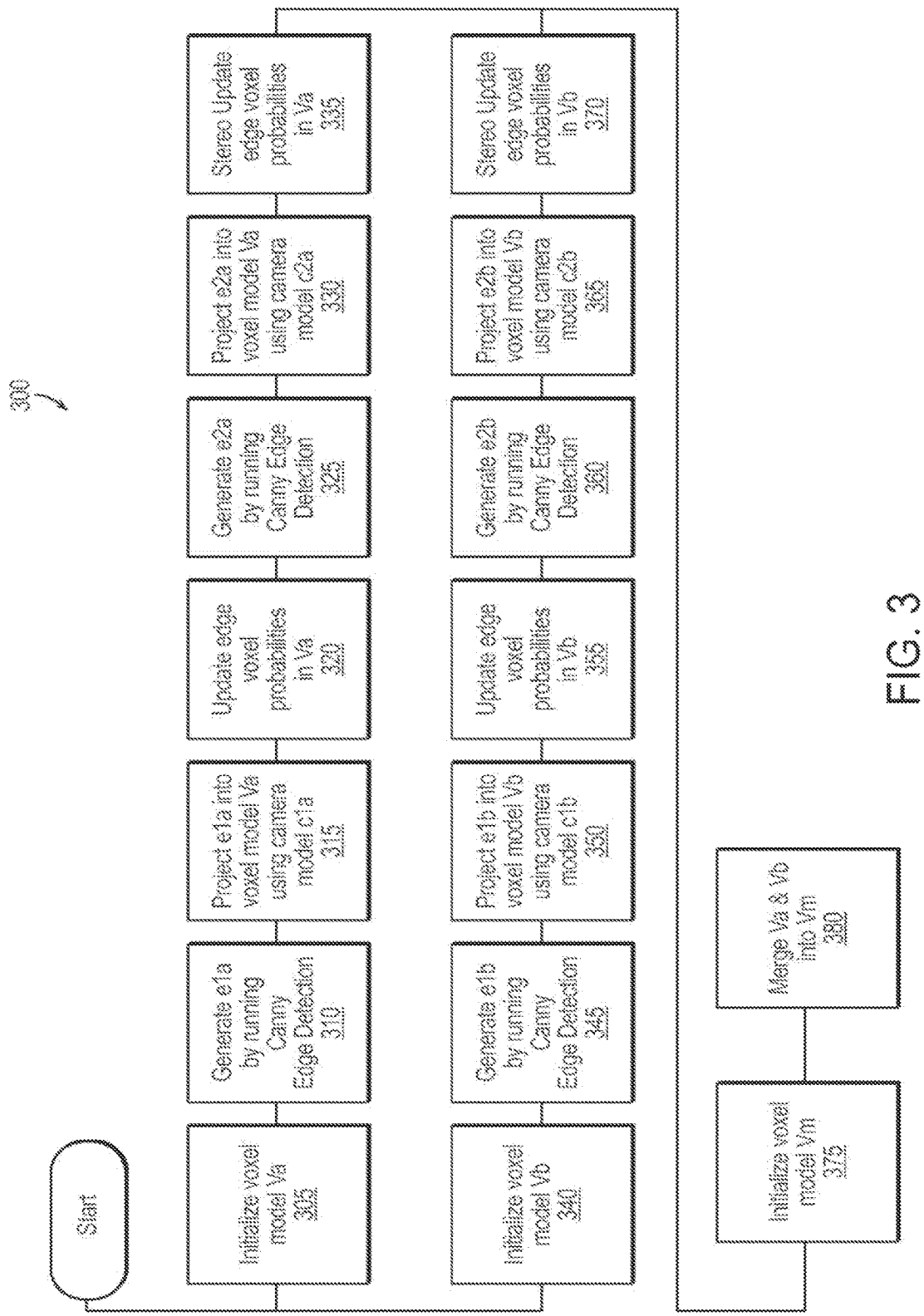
FIG. 3 is a flowchart of an example procedure for automatically bootstrapping a three dimensional edge model from a set of stereo image pairs.

FIG. 3 shows a high-level process flow 300 of one example of the automatic bootstrapping technique implemented by the modeling engine 105 of FIG. 1, for example. At an optional step 305, the modeling engine 105 initializes a first three dimensional edge model generated from stereo image pair-A having stereo image s1a and stereo image s2a. For the ease of reference, the first three dimensional edge model is called "voxel model Va." At step 310, the modeling engine 105 generates edge detected image e1a from stereo image s1a. In a convenient example, the modeling engine 105 executes Canny Edge Detection to generate edge detected image e1a from stereo image s1a. At step 315, the modeling engine 105 projects edge detected image e1a into voxel model Va using a camera model associated with stereo image s1a, which in FIG. 3, is referenced as c1a. At step 320, the modeling engine 105 updates edge voxel probabilities in voxel model Va. For the first edge image e1a, voxel probabilities are updated by back projecting the edge detected image into the 3D edge model and adding "1" to all of the voxels along the camera ray of the edge pixels. For the second edge image e2a, the voxel probabilities are updated by back projecting the edge detected image into the 3D edge model and adding "1" to all of the voxels along the camera ray of the edge pixels. Then all of the voxels are divided by two which corresponds to the number of updates in the 3D edge model. After this procedure, all of the voxels in Va will have a value of 0, corresponding to no edge pixels in either stereo edge image or 1.0 corresponding to edge pixels being present from both stereo edge images.

At step 325, the modeling engine 105 generates edge detected image e2a from stereo image s2a. In a convenient example, the modeling engine 105 executes Canny Edge Detection to generate edge detected image e2a from stereo image s2a. At step 330, the modeling engine 105 projects edge detected image e2a into voxel model Va using a camera model associated with stereo image s2a, which in FIG. 3 is referenced as c2a. At step 335, the modeling engine 105 stereo updates edge voxel probabilities in voxel model Va. In a convenient example, the modeling engine 105 executes an edge voxel model updating procedure to "stereo update" voxel probabilities in voxel model Va. As described below with reference to Psuedocode 1, the stereo updating procedure creates a sparse voxel edge model from one set of stereo pairs.

Psuedocode 1 - Example stereo updating procedure

```
for (z = 0; z < height(Va); z++) {
// Compute the voxel plane (i.e. voxel slab) to image homography
// and vice-versa (i.e. image homography to voxel plane)
Compute image to voxel plane (Va(z)) homography
Compute voxel plane (Va(z)) to image homography
// Warp the image into voxel space using the just
// computed homographies
image_voxels = warp_slab_bilinear(Va(z), homographies);
// edge image is now mapped to the voxel slab.
// Update each voxel in slab
for (x = 0; x < width(edge_voxels); x++) {
    for (y=y; y < length(edge_voxels);y++) {
        edge_voxels(x,y) = edge_voxels(x,y) * image_voxels(x,y);
    }
}
}
```

With reference to Psuedocode 1, in most cases, image_voxels(x,y)=0 because there is a low density of edge pixels in the image. Both, stereo images and edge detected images both have a low density of edges. Typically, an edge detected image will have <1% edges. This condition causes most of the edge voxels in the voxel model Va (volume) to go to 0 as well. As such, the foregoing technique produces a significantly sparser edge voxel model (Va in this instance) than, for example, the Bayesian updating approach taken in [2].

In [2], the authors project accurate camera models from several images into the voxel model and use Bayseian statistical learning techniques to determine if a voxel represents an edge or not. Given a sufficient number of accurate camera models, this has proven successful. However, as stated previously, this is not acceptable for many completely or substantially completely automated applications. One advantage to the sparse edge voxel model approach of the automatic bootstrapping technique described above is that 3D edge models can be creating automatically without any manual adjustments.

Continuing with reference to FIG. 3, in sequence or substantially in parallel with the foregoing steps, at optional step 345, the modeling engine 105 initializes a second three dimensional edge model generated from stereo image pair-B having stereo image s1$b$ and stereo image s2$b$. For the ease of reference, the second three dimensional edge model is called "voxel model Vb." At step 350, the modeling engine 105 generates edge detected image e1$b$ from stereo image s1$b$. In a convenient example, the modeling engine 105 executes Canny Edge Detection to generate edge detected image e1$b$ from stereo image s1$b$.

At step 350, the modeling engine 105 projects edge detected image e1$b$ into voxel model Vb using a camera model associated with stereo image s1$b$, which in FIG. 3 is referenced as c1$b$. At step 355, the modeling engine 105 updates edge voxel probabilities in the voxel model Vb, as described above in reference to voxel model Va.

At step 360, the modeling engine 105 generates edge detected image e2$b$ from stereo image s2$b$. In a convenient example, the modeling engine 105 executes Canny Edge Detection to generate edge detected image e2$b$ from stereo image s2$b$. At step 365, the modeling engine 105 projects edge detected image e2$b$ into voxel model Vb using a camera model associated with stereo image s2$b$, which in FIG. 3 is referenced as c2$b$. At step 370, the modeling engine 105 stereo updates edge voxel probabilities in voxel model Vb. In a convenient example, the modeling engine 105 executes the stereo updating procedure, as described above with reference to Psuedocode 1 and voxel model Va.

At step 375, the modeling engine 105 initializes a merged three dimensional edge model called "voxel model Vm." At step 380, the modeling engine 105 merges voxel model Va (first 3D edge model) and voxel model Vb (second 3D edge model) into a merged voxel model Vm (merged 3D edge model). If stereo image pair-A and stereo image pair-B were accurate relative to one another, then combining them would be as simple as combining the voxels in voxel model Va and voxel model Vb to form merged voxel model Vm. However, in most situations (i.e., real world situations), this is not the case. Stereo pairs are typically not accurate relative to one another. Therefore, a procedure for combining the two volumes, voxel model Va and voxel model Vb, is necessary.

In a convenient example, the modeling engine 105 solves for the maximum correlation (matches) of voxel model Va and voxel model Vb over a series of 3D linear shifts (viz., dx,dy, and dz) to combine the volumes of voxel model Va and voxel model Vb. Psuedocode 2 below describes an example procedure performed by the modeling engine 105 to find the linear 3D transform (dx,dy, and dz) providing a maximum number of matches or "best fit" among the voxel models. In the example, a maxim number of procedure iterations (i.e., 3D linear shifts) is fixed based on set of constants having values equal to 5 but any other values are possible.

---

Psuedocode 2 - Example stereo model merging procedure

```
const int MAX_SHIFT_X = 5;
const int MAX_SHIFT_Y = 5;
const int MAX_SHIFT_Z = 5;
int CorrelationVolume[MAX_SHIFT_X*2+1][MAX_SHIFT_Y*
2+1][MAX_SHIFT_Z*2+1];
for (int shift_x = - MAX_SHIFT_X; shift_x < MAX_SHIFT_X;
shift_x++) {
  for (int shift_y = - MAX_SHIFT_Y; shift_y < MAX_SHIFT_Y;
shift_y++) {
    for (int shift_z = - MAX_SHIFT_Z; shift_z < MAX_SHIFT_Z;
shift_z++) {
      CorrelationVolume[shift_x][shift_y][shift_z] = Va *
      Vb(shifted by x,y,z)
    }
  }
}
BestFitxyz = Max(CorrelationVolume);
Vm = Va * Vb (shifted by BestFitxyz)
```

---

After finding the best fit, in this example, the modeling engine 105 merges 380 (combines) the voxel models by taking each voxel in voxel model Va and multiplying it by the voxels in voxel model Vb shifted by the best fit dx,dy, and dz. The procedure 300, executed by the modeling engine 105, ends having created, automatically, the merged voxel model Vm (i.e. an automatically bootstrapped 3D edge model that can be used for subsequent camera correction) from the stereo image pair-A (s1$a$, s2$a$) and stereo image pair-B (s1$b$, s2$b$). At this point, the merged voxel model Vm is a sparse 3D edge model. Given the limited 3D information contained in the merged voxel model Vm, many subsequent images may not register well to the model. However, given a large enough set of subsequent images, the merged voxel model Vm can be improved or refined by updating the merged voxel model Vm with more 3D content, as described immediately below. Updating the merged voxel model Vm with additional 3D content helps to successfully register satellite imagery that may have vastly different illumination conditions, collection geometry, or temporal characteristics from the stereo pairs used to bootstrap the 3D edge model.

Figure 4:
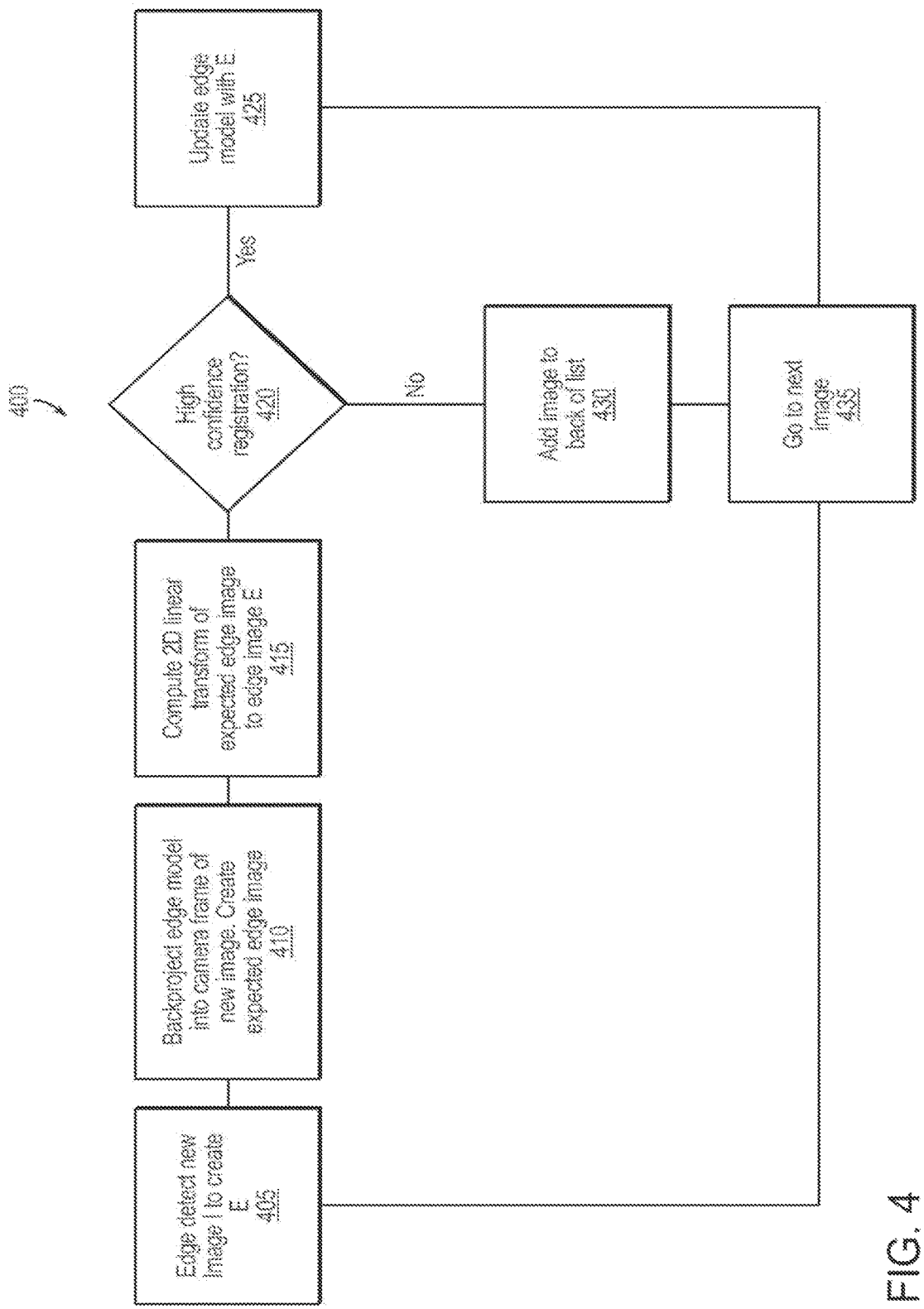
FIG. 4 is a flowchart of an example procedure for refining a three dimensional edge model with a subsequent image.

FIG. 4 shows an example procedure 400 for refining (updating) a three dimensional edge model with 3D content to improve registration of images to the 3D edge model, also referred to as "image to model registration." For example, the procedure 400 may be implemented by the modeling engine 105 of FIG. 1 to refine the merged voxel model Vm (or other sparse 3D edge model), which is bootstrapped from a set of stereo image pairs according to procedure 300 of FIG. 3. The refining procedure 400 can be applied to any 3D edge model to improve/refine the 3D edge model. For example, the refining procedure 400 can refine a 3D edge model boostrapped with manually corrected images, such as the 3D edge model described in [2].

The modeling engine 105 edge detects 405 subsequent image I to create edge detected image E. In a convenient example, the modeling engine 105 executes Canny Edge Detection to create edge detected image E from subsequent image I. The modeling engine 105 projects 410 a three dimensional edge model (e.g., the merged voxel model Vm bootstrapped from a set of stereo image pairs according to procedure 300 of FIG. 3) into the camera frame of subsequent image I, using a camera model associated with the subsequent image I, to create expected edge image X. The modeling engine 105 determines a solution for registering the expected edge image X to edge detected image E. In a convenient example, the modeling engine 105 computes 415 a 2D linear transformation of the expected edge image X to edge detected image E as the registration solution.

The modeling engine 105 determines 420 whether the registration solution, mapping the expected edge image X to the edge detected image E, is a high confidence registration solution. At a high-level, what is meant by "high confidence registration solution" is in a subject registration solution, how well do edge projections of the expected edge image X match edge pixels of the edge detect image E, as compared to other possible registration solutions. The determination of whether a registration solution is a high confidence or is a precise registration solution is described later with reference to FIGS. 5 and 6.

Continuing with FIG. 4, if the modeling engine 105 determines 420 there is a high confidence registration between subsequent image I and the three dimensional edge model, then modeling engine 105 updates 425 the 3D edge model with edge detect image E (e.g., using the procedure described with reference to step 320 of FIG. 3). If the modeling engine 105, however, determines 420 there is not a high confidence registration between subsequent image I and the three dimensional edge model, then the modeling engine 105 does not update the three dimensional edge model with edge detect image E. In a convenient example shown in FIG. 4, the modeling engine 105 adds 430 the "rejected" image I to an image list to be processed again in re-registration procedure described below in greater detail. After either step 425 or step 430, the modeling engine 105 continues and goes 435 to a next image to repeat the foregoing refining procedure 400 with the next image.

As such, procedure 400 includes a mechanism that advantageously rejects those images that would corrupt the three dimensional edge model and includes those images that more accurately register to the 3D edge model. For example, the modeling engine 105 rejects low quality images (e.g., cloudy images, out of focus images, etc.) and images with inaccurate camera models (i.e., register poorly with few edges that match). In doing so, the modeling engine 105 increases the accuracy and completeness of the 3D edge model. Given a large number of images (e.g., on the order of tens of images), the modeling engine 105 implementing the procedure 400 refines an initial three dimensional edge model to produce a "refined" 3D edge model.

In a convenient example show in FIG. 4, after the modeling engine 105 refines (updates) the (initial) three dimensional edge model with subsequent images that have high confidence registration solutions, the modeling engine 105 attempts to re-register images that were initially rejected, which are stored or referenced in a list at step 430. Because the refined three dimensional edge model includes more complete content (images having high confidence registration solutions), many images that were initially rejected (images without high confidence registration solutions) may subsequently re-register successfully.

Described above are techniques for automatically creating a three dimensional edge model (i.e., bootstrapping a P3DM) using 2 sets of stereo pair images and for refining/updating a three dimensional edge model with additional images to improve image to model registration. The discussion is now turned to novel approaches for correcting RPC camera models associated with images that include determining an uncertainty associated with registering an image to a three dimensional edge model.

One approach to correcting a camera model uses a "registration solution" or mapping between two or more images (taken at different times, from different cameras, or from different perspectives) to correct the camera model. The registration solution, however, may not be "precise." To illustrate precision as it applies to a registration solution, consider the example shown in FIG. 5.

Figure 5:
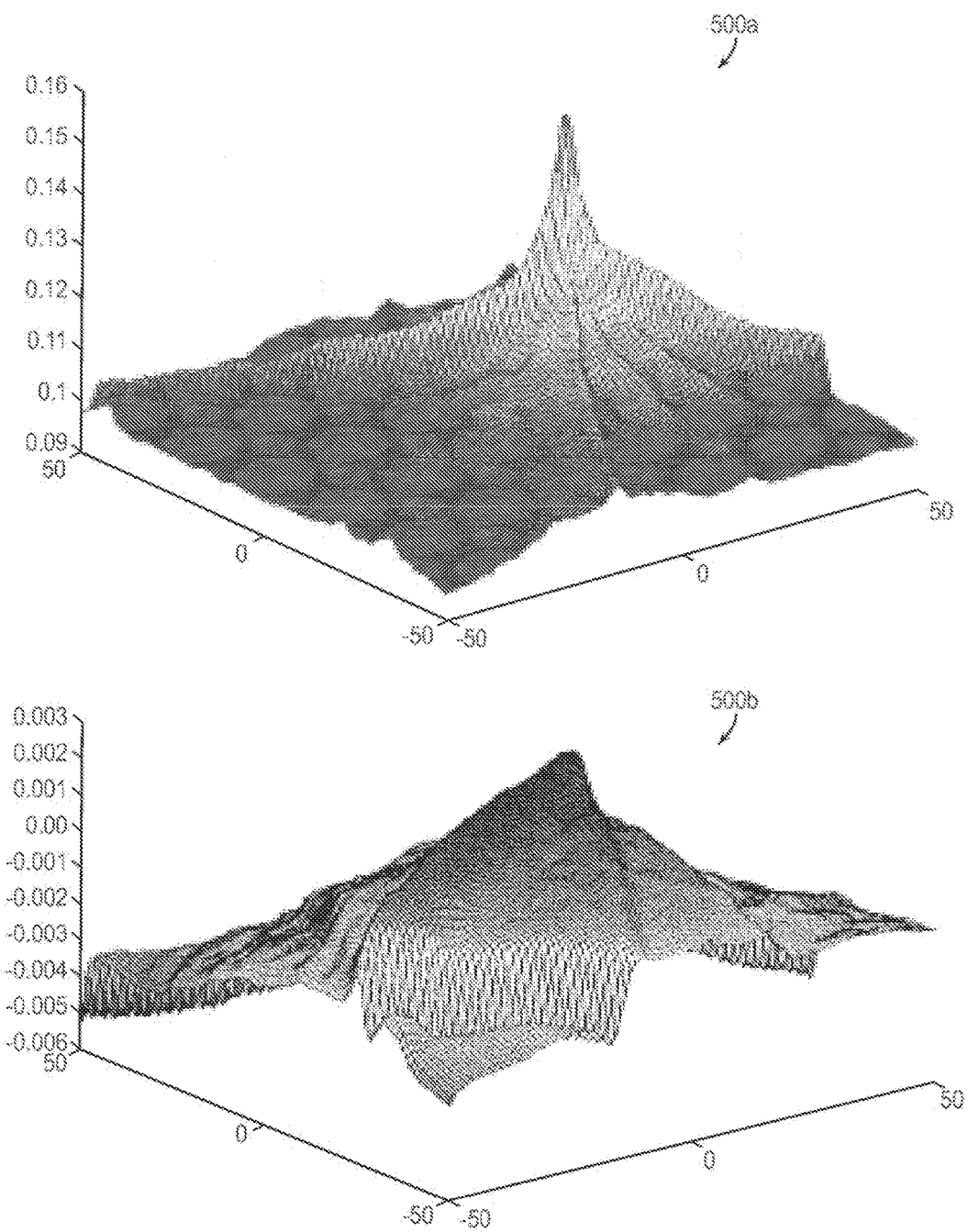
FIG. 5 are graphs of example registrations solutions.

FIG. 5 shows a correlation matrix-A 500a and correlation matrix-B 500b in which the X and Y axes are defined as candidate $t_x$, $t_y$ shifts of a registration solution (image to model registration) and the Z axis is the pixel correlations (matches) from an edge detected image E and expected edge image X. Each correlation matrix, 500a, 500b, is produced by shifting E over all possible $t_x$, $t_y$ of X. As shown in FIG. 5, the highest peak defines the maximum correlation intensity or number of matching edges of E to X. As shown, the correlation matrix-A 500a, characterized by sharp peak(s), represents a much more precise registration solution than one represented by correlation matrix-B 500b, characterized by rounded peak(s).

An imprecise registration solution, such as the one represented by correlation matrix-B 500b, may not correct the errors in the camera model. Left uncorrected, errors in the camera model may, for example, prevent or hinder use of algorithms, such as those used by NGA's Probabilistic 3-Dimensional Modeling (P3DM) software, to build high quality 3D models, automatically. What is needed is an approach for correcting camera models that accounts for the precision of registration solutions.

The correcting engine 110 implements a linear transformation approach or affine transformation approach for correcting RPC camera models associated with images. In some examples, the correcting engine 110 implements a combination of linear transformation and affine transformation approaches. In each instance, the correcting engine 110 accounts for the precision of registration solutions by determining an uncertainty associated with registering an image to a three dimensional edge model.

In implementing the linear transformation approach, also called the "2D block adjustment approach," the correcting engine 110 computes linear transformations to correct inaccurate RPC camera models in x,y space working under the assumption that the RPC data is accurate enough for a simple rigid transform solution. The correcting engine 110 determines whether one of the computed transformations, called a subject registration solution, is a "high confidence registration" solution. In a convenient example, to identify a high confidence registration solution, the correcting engine 110 evaluates whether the subject registration solution is "statistically better" than alternative registration solutions. For example, the correcting engine 110 carries out the evaluation according to the approach described in [5]. In other examples, the correcting engine 110 performs McNemar statistics to evaluate the subject and alternative registration solutions.

Based on the evaluation, the correcting engine 110 establishes an precision metric. The confidence (or uncertainty) of the subject registration solution is determined based on the established metric. From example, the subject registration solution is a high confidence registration solution when the precision metric meets or exceeds a threshold value or other boundary condition. Based on the above determination, the correcting engine 110 applies the subject registration solution to the inaccurate RPC camera model resulting in a corrected RPC camera model.

When the precision of the RPC data is low (i.e. the determined uncertainty is high), in most instances, it is because there are spurious scene artifacts, such as clouds, atmospheric distortions or collection artifacts. When these scene artifacts are present, the correcting engine 110, implementing the linear transformation approach, correctly identifies the registration solution as dubious and rejects the solution (i.e., does not apply) or causes the registration solution to be rejected.

However, in other instances, the RPC data is not accurate enough for the 2D block adjustment approach. In these instances, the correcting engine 110, implementing the linear transformation approach, rejects registration solutions even though the image may not contain spurious scene artifacts. The rejections are due to problematic RPC data and not due to scene artifacts. In some situations, the linear transformation approach may not be adequate and a higher order transformation, such as an affine transformation, may be needed.

In implementing the affine transformation approach, the correcting engine 110 solves an affine transformation that is defined as:

$$g = \begin{bmatrix} scale_x & skew_x & translation_x \\ skew_y & scale_y & translation_y \\ 0 & 0 & 1 \end{bmatrix} \quad (1)$$

The affine transformation is a mapping of the image to the model, in which the model has been projected into the image frame using the satellite RPC data. One difference between the approaches is that 2D block adjustment approach solves for translation$_x$ and translation$_y$ ([t$_x$, t$_y$]) whereas the affine transformation approach solves for 6 parameters of an affine matrix, viz., scale$_x$, skew$_x$, translation$_x$, scale$_x$, skew$_x$, and translation$_y$. [0064] In some examples of the affine transformation approach, the correcting engine 110 uses a genetic algorithm (GA) to solve for the optimal values of g as shown in equation (1). Each gene in the GA population has chromosomes that map to the parameters of g. A description of GAs can be found in [6], which is incorporated herein by reference. With reference to Psuedocode 3 below, the correcting engine 110 performs the GA and attempts to maximize a fitness function defined as the correlation of EdgeImage pixels to ExpectedEdgeImage pixels. The result is a solution for g that represents the best affine transformation of the EdgeImage to the ExpectedEdgeImage.

Psuedocode 3 - High-level genetic algorithm processing performed by the correcting engine 110.

```
const int NUM_GENES = 20;
const int GENES_TO_KEEP = {1..5};
const int GENES_TO_MUTATE = {6..10};
const int GENES_TO_CROSSOVER = {11..15};
const int GENES_TO_REGENERATE = {16..20};
const int MAX_GENERATIONS = 200;
const int BAIL_OUT_GENERATION = 10;
generation = 0;
generations_without_change = 0;
best_correlation = −1;
population = genes(NUM_GENES);
do
{
  //
```

Psuedocode 3 - High-level genetic algorithm processing performed by the correcting engine 110.

```
  // Calculate the fitness function. This is measured by the
  // number of pixels that correlate from the edgeImage
  // to the expectedEdgeImage when the edgeImage is transformed
  // using the g affine transformation defined in the Gene
  //
  for i = 0 to NUM_GENES
  {
    population(i).fitness(edgeImage, expectedEdgeImage);
  }
  //
  // Sort the genes from most fit at index 0 to least fit
  //
  sort(population)
  //
  // Check if the calculated fitness is better than the best
  // so far. If it is, replace our best. If not, increment
  // our bail our counter.
  //
  if (population(0).getFitness( ) > best_correlation)
  {
    best_correlation = population(0).correlated_pixels)
    generations_without_change = 0;
  }
  else
  {
    generations_without_change = generations_without_change + 1;
  }
  for i = 0 to NUM_GENES
  {
    //
    // Keep top GENES_TO_KEEP genes - do nothing to them.
    //
    //
    // For the GENES_TO_MUTATE, copy the top 5 genes, and
    // mutate them
    //
    if i in GENES_TO_MUTATE
    {
      population(i).deep_copy(population(i−5));
      population(i).mutate( );
    }
    //
    // For the GENES_TO_CROSSOVER, we copy random chromosomes
    // from the top 10 genes
    //
    if i in GENES_TO_CROSSOVER
    {
      population(i).mutate(
        population(random(0:10), population(random(0:10)));
    }
    //
    // for the remainder (i.e. the GENES_TO_REGENERATE), we just
    // throw them away and regenerate subsequent ones.
    //
    if i in GENES_TO_REGENERATE
    {
      population(i).regenerate( );
    }
  } // for
  generation = generation + 1;
}
while generation < MAX_GENERATION
  and generations_without_change < BAIL_OUT_GENERATION
best_g = population(0).getG( );
```

In the affine transformation approach, similar to the 2D block adjustment approach, the correcting engine 110 determines whether a subject registration solution, g in this approach, is a "high confidence registration" solution. Based on the determination, the correcting engine 110 applies the subject registration solution to the inaccurate camera model resulting in a corrected camera model associated with the image.

Figure 6:
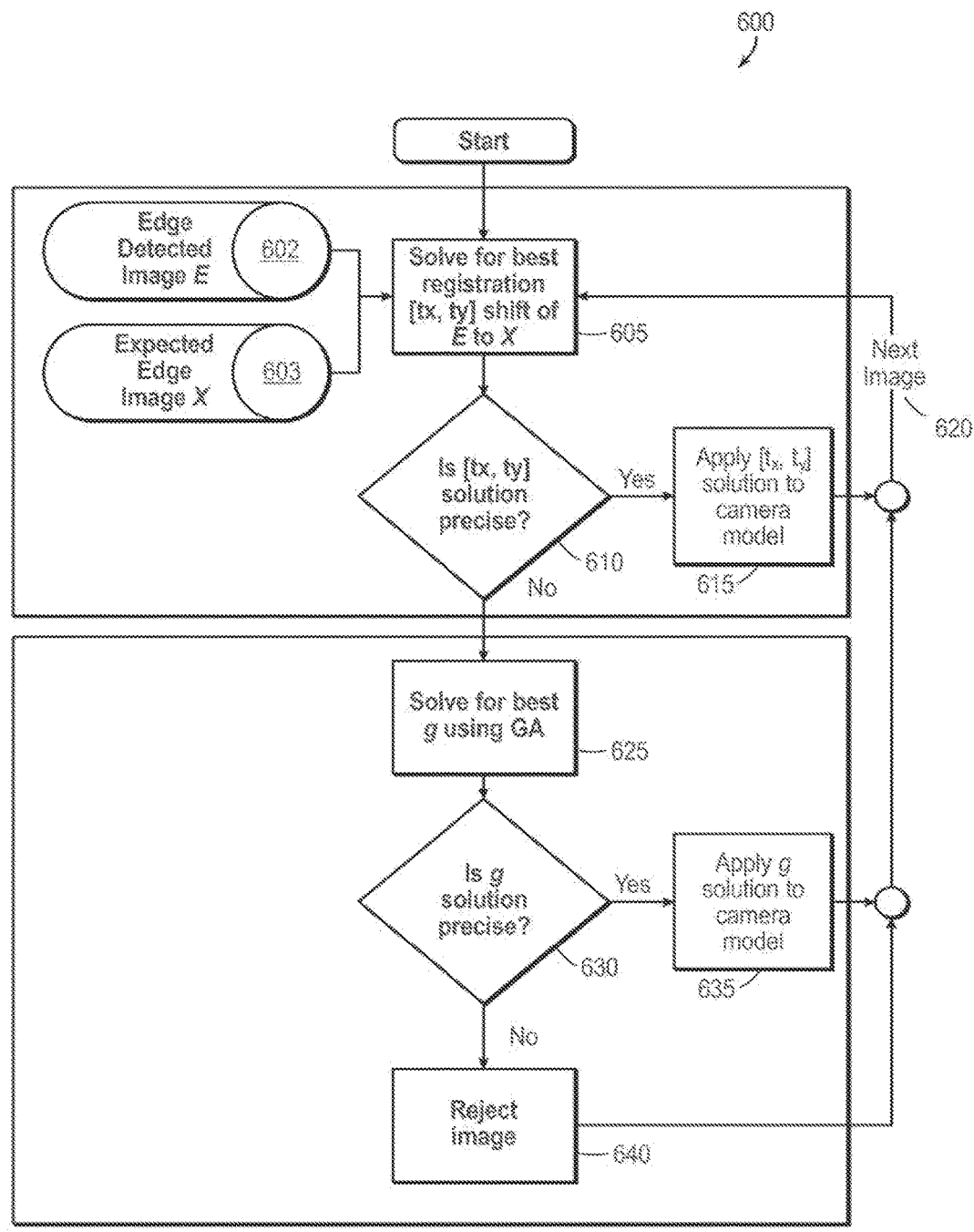
FIG. 6 is a flowchart of an example procedure correcting a camera model associated with an image.

FIG. 6 shows an example procedure 600 for correcting an RPC camera model associated with an image combining both 2D block adjustment and affine transformation approaches. The example procedure 600 may be implemented by the correcting engine 110 of FIG. 1, for example. Given an edge detected image E 602 and expected edge image X 603, the correcting engine 110 solves 605 for the best registration solution [$t_x$, $t_y$] shift of E to X (linear transformation), as described above. For ease of reference, the best registration solution [$t_x$, $t_y$] is called an "initial best registration solution."

In a convenient example, the given edge detected image E 602 results from edge detecting an image, as described with reference to FIG. 4 (e.g., using Canny Edge Detection). The correcting engine 110, implementing the procedure 600, corrects a camera model associated with this image. In another convenient example, the given expected edge image X 603 results from projecting a 3D edge model, as also described with reference to FIG. 4.

The correcting engine 110 determines 610 whether the initial best registration solution (linear transformation [$t_x$, $t_y$]) is precise, as described above. If the correcting engine 110 determines 610 that the initial best registration solution is precise, than the correcting engine 110 corrects the associated camera model by applying 615 the initial best registration solution (linear transformation [$t_x$, $t_y$]) to the camera model. In a convenient example, the correcting engine 110 causes the modeling engine 105, for example, by way of an indicator, to update the three dimensional edge model with the image, as described with reference to FIG. 4. The correcting engine 110 repeats 620 the aforementioned steps with another edge detected image E and another expected edge image X corresponding to a next image.

If the correcting engine 110 determines 610 that the initial best registration solution (linear transformation [$t_x$, $t_y$]) is not precise (e.g., a corresponding metric does not meet or exceed a threshold or other boundary condition), than the correcting engine 110 solves 625 for the best affine transformation g, as described above. For ease of reference, the best affine transformation g is called a "revised best registration solution."

The correcting engine 110 determines 630 whether the revised best registration solution (affine transformation g) is precise, as described above. If the correcting engine 110 determines 630 that the revised best registration solution is precise, than the correcting engine 110 corrects the associated camera model by applying 635 the revised best registration solution to the camera model. In a convenient example, the correcting engine 110 causes the modeling engine 105, for example, by way of an indicator, to update the three dimensional edge model with the image, as described with reference to FIG. 4. The correcting engine 110 repeats 620 the aforementioned steps with another edge detected image E and another expected edge image X corresponding to a next image.

If the correcting engine 110 determines 630 that the best revised registration solution is not precise (e.g., a corresponding metric does not meet or exceed a threshold or other boundary condition), than the correcting engine 110 causes the modeling engine 105, for example, by way of an indicator, to reject 640 the image. The rejected image may be re-evaluated in view of a refined three dimensional edge model, as described with reference to FIG. 4.

In a substantially automated environment, the correcting engine 110 does not have apriori knowledge of whether the initial best registration solution (linear transformation [$t_x$, $t_y$]) fails due to scene artifacts or due to RPC parameters. In such an environment, the correcting engine 110 may falsely conclude that an image is a good candidate for image to model registration when in fact the image is cloudy or otherwise unexploitable. Advantageously, the correcting engine 110 implementing the procedure 600, after solving for the revised best registration solution (affine transformation g), the correcting engine 110 determines 630 whether the revised best registration solution is precise or "usable." In the context of this disclosure, "usable" is defined to mean a high level of precision relative to other possible solutions, as described above with reference to FIG. 5.

In other examples, the procedure 600 may be implemented by parallel processing architectures as multi-core CPUs and/or massively parallel General Purpose Graphics Processing Unit (GPGPU) computing.

The linear, affine, and combination of linear and affine approaches described above have several advantages over other approaches including the following:

The described approaches register one binary edge image (e.g., the edge detected image E 602 of FIG. 6) to a probabilistic edge image (e.g., the expected edge image X 603 of FIG. 6). Other approaches, such as the one described in [5], register two binary edge detected images. The approach using probabilistic edge image advantageously allows for the image-to-model registration of imagery with a larger range of ground sample distances, illumination conditions, and collection geometries.

The described approaches process full frames due to the model based nature of the candidate registration solution. Other approaches, such as the one described in [5], process image patches selected via a local neighborhood search with multiple random restarts. The approach using gull frame registration advantageously creates a high quality registration solution in that all edge pixels are included in the final solution. Other approaches, such as the one described in [5] can be biased by local optima found in image patches.

Some examples of the described approaches can be applied to any scene that has a well defined camera model because the underlying probabilistic edge model is projected into the same camera frame as the candidate image. Other approaches, such as the one described in [5], are applied to rigid body transformations, which are limited to temporal changes observed via a fixed camera. Accordingly, the described approaches may be used in greater number applications. In a convenient example, the subject approach would work on satellite imagery collected from a wide range of collection geometries (for example, one taken at nadir versus 10° off nadir). Other approaches, such as the one described in [5], can only provide a posterior precision metric and cannot be used as a registration solution in this example.

The above-described examples of the modeling engine 105 and correcting engine 110 and corresponding procedures and systems can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Procedure or method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Computer program products suitable for embodying computer program instructions and data include all forms of non-volatile memory, including by way of example semiconductor memory devices. The computer program products can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques and approaches can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques and approaches can be implemented in a distributed computing system that includes a back-end component. The back-end component can, for example, be a data server, a middleware component, and/or an application server. The above described techniques and approaches can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, Hiper-LAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing examples are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

REFERENCES

[1] Digital Globe—Content Collection for Quickbird from http://www.digitalglobe.com/about-us/content-collection#satellites&quickbird<retrieved2011-11-11>

[2] Pollard, T., Eden, I., Mundy, J., Cooper, D., "A volumetric approach to change detection satellite imagery", *Photogrammetric Engineering and Remote Sensing* (2010), 76(7), 817-831.

[3] Grodecki, J., Dial, G., "Block Adjustment of High-Resolution Satellite Images Described by Rational Polynomials", *Photogrammetric Engineering and Remote Sensing* (2003), 69(1), 59-68

[4] Pritt, M., Gibbons. M., LaTourette, K., "Automated Cross-Sensor Registration, Orthorectification, and Geopositioning using LIDAR Digital Elevation Models. *Proceedings of iEEE Applied Imagery Pattern Recognition Workshop* 2010.

[5] Simonson, K., Drescher, S., Tanner, F., "A Statistics Based Approach to Binary Image Registration with Uncertainty Analysis", *IEEE Transactions on Pattern Analysis and Machine Intelligence.* January 2007.

[6] Russell, S., Norvig, P. Artificial Intelligence—A Modern Approach. (1995)

What is claimed is:

1. A method for correcting an inaccurate camera model associated with an image comprising:
   in a correcting engine:
   generating an edge detected image from an image, the image associated with an inaccurate camera model;
   projecting a three dimensional edge model with the inaccurate camera model resulting in an expected edge image;
   calculating a subject registration solution registering the edge detected image to the expected edge image;
   determining whether the calculated subject registration solution is a high confidence registration solution; and
   based on the determination, applying the subject registration solution to the inaccurate camera model resulting in a corrected camera model associated with the image,
   wherein calculating the subject registration solution includes computing a two-dimensional linear transformation and/or affine transformation mapping the expected edge image to the edge detected image, and
   wherein determining whether the subject registration is a high confidence registration solution includes:
   evaluating whether the subject registration solution is statistically better than alternative registration solutions; and
   establishing a precision metric based on the evaluation,
   wherein the confidence of the subject registration solution is determined based on the established precision metric.

2. The method of claim 1, wherein evaluating whether the subject registration solution is statistically better than alternative registration solutions includes using McNemar statistics to evaluate the subject and alternative registration solutions.

3. A computer-readable non-transitory storage medium encoded with instructions that when executed by a data processing apparatus cause the data processing apparatus to:
   generate an edge detected image from an image, the image associated with an inaccurate camera model;
   project a three dimensional edge model with the inaccurate camera model resulting in an expected edge image;
   calculate a subject registration solution registering the edge detected image to the expected edge image;
   determine whether the calculated subject registration solution is a high confidence registration solution; and
   based on the determination, apply the subject registration solution to the inaccurate camera model resulting in a corrected camera model associated with the image,
   wherein calculating the subject registration solution includes computing a two-dimensional linear transformation and/or affine transformation mapping the expected edge image to the edge detected image, and
   wherein determining whether the subject registration is a high confidence registration solution includes:
   evaluating whether the subject registration solution is statistically better than alternative registration solutions; and
   establishing a precision metric based on the evaluation,
   wherein the confidence of the subject registration solution is determined based on the established precision metric.

4. The computer-readable non-transitory storage medium of claim 3, further encoded with instructions that when executed by a data processing apparatus cause the data processing apparatus to use McNemar statistics to evaluate whether the subject registration solution is statistically better than alternative registration solutions.

\* \* \* \* \*